United States Patent Office 3,803,132
Patented Apr. 9, 1974

3,803,132
NOVEL STEROID ESTER
Andre Pierdet, Noisy-le-Sec, France, assignor to Roussel-UCLAF, Paris, France
No Drawing. Filed Feb. 7, 1973, Ser. No. 330,407
Claims priority, application France, Feb. 18, 1972, 7205527
Int. Cl. C07c 173/10
U.S. Cl. 260—239.5                     3 Claims

ABSTRACT OF THE DISCLOSURE

21 - m - sulfobenzoates of 6,16α-dimethyl-2'-phenyl-$\Delta^{2,4,6}$-pregnatrieneolo [3,2-c] - pyrazol-11β,17,21-triol-20-one of the formula

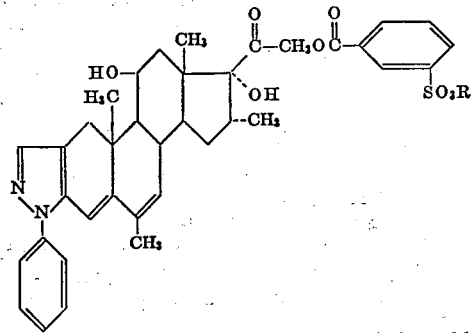

(I)

wherein R is selected from the group consisting of hydrogen and alkali metal useful as anti-inflammatory agents having prolonged activity and their preparation.

STATE OF THE ART

French Pat. No. 1,482,808 describes the alcohol, 6,16β-dimethyl-2'-phenyl-$\Delta^{2,4,6}$ - pregnatrieneolo [3,2-c]-pyrazol-11β, 17,21-triol-20-one and the simple esters thereof such as the acetate ester and their anti-inflammatory activity.

OBJECTS OF THE INVENTION

It is an object of the invention to provide the novel 21-m-sulfobenzoates of Formula I.

It is another object of the invention to provide a novel process for the preparation of the 21-m-sulfobenzoates of Formula I.

It is an additional object of the invention to provide novel anti-inflammatory compositions having prolonged activity.

It is a further object of the invention to provide a novel method of relieving inflammation in warm-blooded animals.

These and other objects and advantages of the invention will become obvious from the following detailed description.

THE INVENTION

The novel esters of the invention are 21-m-sulfobenzoates of 6,16α-dimethyl-2'-phenyl-$\Delta^{2,4,6}$-pregnatrieneolo [3,2-c]-pyrazol-11β,17,21-triol-20-one of the formula

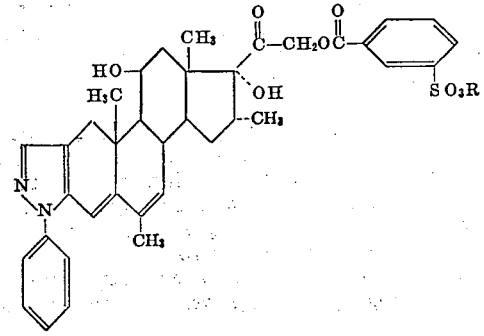

(I)

wherein R is selected from the group consisting of hydrogen and alkali metal. These esters have a considerably more prolonged anti-inflammatory activity than the known esters thereof described in French Pat. No. 1,482,808.

The novel process for the preparation of the 21-m-sulfobenzoates of Formula I comprises reacting the steroid alcohol of the formula

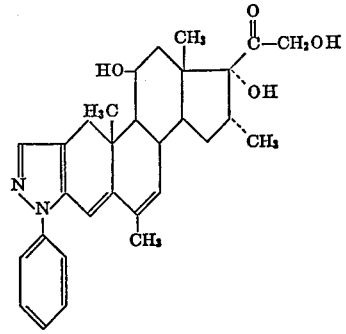

(II)

with an esterifying derivative of methane sulfonic acid to obtain the corresponding 21-mesylate, reacting the latter with a double salt of m-sulfobenzoic acid in the presence of a dialkyl carboxylic acid amide and passing the resulting product through an ion exchange resin in the acid form to obtain the product of Formula I wherein R is hydrogen. If desired, the latter may be reacted with an alkali metal hydroxide to obtain the corresponding alkali metal salt of Formula I.

In a preferred embodiment of the process, the 21-mesylate is reacted at about 95° C. with disodium m-sulfobenzoate in the presence of dimethylformamide and passing the product obtained through an ion exchange resin in the acid form to form the product of Formula I wherein R is hydrogen. If desired, the latter may be reacted with sodium hydroxide to form the corresponding sodium salt although other alkali metal hydroxides such as lithium or potassium hydroxide.

The novel anti-inflammatory compositions having prolonged activity of the invention are comprised of an effective amount of a compound of Formula I and a pharmaceutical carrier. The said compositions may be in the form of simple tablets, dragées, gelules, granules, solutions, suspensions, syrups, suppositories, pomades, cremes, gels and aerosols and in the form of injectable solutions or suspensions or sterile powders for extemporaneous dissolution made by the usual methods.

The excipient used for the pharmaceutical carrier may be any of those usually used such as talc, arabic gum, lactose, amidon, magnesium stearate, cacao butter, aqueous or non-aqueous vehicles, fatty substances of animal or vegetable origin, paraffin derivatives, glycols, diverse wetting agents, dispersants or emulsifiers and preservatives.

The compositions of the invention due to their remarkable anti-inflammatory activity are very useful in therapy, for example in humans for the treatment of acute or chronic rheumatism, inflammatory dermatosis, asthma and viral hepatitis. Clinical experimentation has confirmed the remarkable activity of the products for the treatment of asthma crisis. The regular and prolonged action of the compound of Formula I wherein R is hydrogen has been ascertained in which certain known derivatives were slightly active.

The novel method of the invention for the treatment of inflammation in warm-blooded animals comprises administering to warm-blooded animals an anti-inflammatorily effective amount of a compound of Formula I. The compounds may be administered orally, parenterally or topically. The usual daily effective dose is 0.002 to 0.2 mg./kg. depending upon the method of administration.

In the following examples there are described several preferred embodiments to illustrate the invention. However, it should be understood that the invention is not intended to be limited to the specific embodiments.

EXAMPLE 1

21-m-sulfobenzoate of 6,16α-dimethyl-2'-phenyl-$\Delta^{2,4,6}$-pregnatrieneolo [3,2-c]-pyrazol-11β,17,21-triol-20-one Step A.—21-mesylate of 6,16α-dimethyl - 2' - phenyl-$\Delta^{2,4,6}$-pregnatrieneolo [3,2-c] - pyrazol - 11β,17,21 - triol-20-one: A solution of 10.33 g. (0.0212 mole) of 6,16α-dimethyl-2'-phenyl-$\Delta^{2,4,6}$-pregnatrieneolo [3,2-c]-pyrazol-11β,17,21-triol-20-one in 60 ml. of methylethylpyridine was stirred for 10 minutes at 24° C. and 3.3 ml. (0.0424 mole) of methane sulfonyl chloride was added to the resulting solution over 5 minutes. The temperature was raised from 24° C. to 28° C. over 10 minutes and the mixture was cooled on an ice bath to 10°±2° C. which temperature was maintained for 1 hour. The resulting mixture was added to 250 ml. of distilled water and 40 ml. of concentrated hydrochloric acid and the mixture was stirred for two hours and then the pH was verified to be 1. The mixture was extracted with ethyl acetate and the organic phase was washed with water to a pH of 4–5, was dried over sodium sulfate and evaporated to dryness under reduced pressure to obtain an amorphous product. The latter was chromatographed over silica gel eluting with a 4–6 ethyl acetate-benzene mixture to obtain 7.7 g. of a white amorphous product which was crystallized from 1–1 acetone-water mixture. After vacuum filtration, the product was washed and dried to obtain 6.56 g. (55% yield) of 21-mesylate of 6,16α-dimethyl-2'-phenyl-$\Delta^{2,4,6}$-pregnatrieneolo [3,2-c] - pyrazol-11β,17,21-triol-20-one melting at 195° C. and having a specific rotation $[\alpha]_D^{20}$= +1.5°±1° (c.=0.65% in chloroform). The product occurred as white crystals soluble in ethanol, chloroform, acetone and ethyl acetate and insoluble in water.

Step B.—21-m-sulfobenzoate of 6,16α - dimethyl - 2'-phenyl-$\Delta^{2,4,6}$-pregnatrieneolo [3,2-c] - pyrazol - 11β, 17, 21-triol-20-one: 1.03 g. (0.0123 mole) of sodium bicarbonate were added to a mixture of 3 g. (0.0132 mole) of monosodium m-sulfobenzoate in 3 ml. of distilled water heated to 90–95° C. and after stirring for 10 minutes, the mixture was added to 100 ml. of dimethylformamide. The mixture was distilled to entrain all the water and was cooled to 95° C. Then, 5 g. (0.0088 mole) of the product of Step A was added thereto all at once and the mixture was stirred at 95° C. for 5 hours under a current of nitrogen. The mixture was concentrated to dryness under reduced pressure and the residue was taken up in 100 ml. of a solution of ethanol containing 50% water. The resulting solution was passed through an ion exchange resin (Dowex 50 type) in the acid form. The eluate was recovered and the alcohol was distilled off under a reduced pressure of 12 mm. Hg and a temperature <50° C. An acid crystallized and was recovered by vacuum filtration and was washed 4 times with distilled water. After a second passage through the ion exchange resin followed by a distillation under reduced pressure, a creme solid product was obtained which was dissolved in 60 ml. of acetone. 60 ml. of water were added thereto and the solution was concentrated. The crystals formed were recovered by vacuum filtration and were washed with a 15–60 acetone-water mixture. The product was redissolved in 70 ml. of acetone and after 60 ml. of water were added, the solution was concentrated. The crystals formed were recovered by vacuum filtration and were washed with a 25–60 acetone-water mixture. The raw product was recrystallized from a 1–1 acetone-water mixture and after concentration, the crystals were recovered by vacuum filtration and were washed with a 15–50 acetone-water mixture. After drying under reduced pressure, 4.05 g. (68.5% yield) of 21-m-sulfobenzoate of 6,16α-dimethyl-2'-phenyl-$\Delta^{2,4,6}$-pregnatrieneolo [3,2-c]-pyrazol - 11β,17, 21-triol-20-one was obtained melting at 280° C. and having a specific rotation $[\alpha]_D^{20}$= +103°±2° (c.=1% in ethanol with 50% water). The product occurred in the form of fine needles soluble in a water-acetone mixture and a water-ethanol mixture and slightly soluble in acetone, water and ethanol.

*Analysis.*—$C_{37}H_{40}O_8N_2S$ (molecular weight=672.78). Calculated (percent): C, 66.05; H, 5.99; N, 4.17; S, 4.77. Found (percent): C, 65.8; H, 6.3; N, 4.0; S, 4.6.

EXAMPLE 2

Sodium salt of 21-m-sulfonbenzoate of 6,16α - dimethyl-2'-phenyl-$\Delta^{2,4,6}$-pregnatrieneolo [3,2 - c] - pyrazol-11β, 17,21-triol-20-one 1.6 g. (0.00238 mole) of 21-m-sulfobenzoate of 6,16α-dimethyl-2'-phenyl-$\Delta^{2,4,6}$-pregnatrieneolo[3,2-c] - pyrazol-11β,17,21-triol-20-one were added to a solution of 23.8 ml. of 0.1 N sodium hydroxide and 137 ml. of distilled water and the mixture was warmed to obtain a limpid solution and then the pH was adjusted to 7.3 by addition of small quantities of the free 21-m-sulfobenzoate of 6, 16α-dimethyl-2' -phenyl-$\Delta^{2,4,6}$ - pregnatrieneolo [3,2 - c]-pyrazol-11β,17,21-triol - 20 - one. The solution was then filtered and the filtrate was lyophilized to obtain 1.61 g. (97.5% yield) of the sodium salt of 6,16α-dimethyl-2'-phenyl-$\Delta^{2,4,6}$-pregnatrieneolo [3,2-c] - pyrazol - 11β,17, 21-triol-20-one in the form of a pale yellow solid soluble in water.

*Analysis.*—$C_{37}H_{39}O_8N_2NaS$ (molecular weight=694.77). Calculated (percent): C, 58; H, 6.14; N, 3.63; Na, 3.01; S, 4.2. Found (percent): C, 58.5; H, 6.2; N, 3.8; Na, 3.1; S, 4.1.

U.V. spectrum (ethanol):

Max. at 228 nm $E_{1cm.}^{1\%}$=300
Max. at 282 nm $E_{1cm.}^{1\%}$=242
Max. at 314 nm $E_{1cm.}^{1\%}$=273 $\epsilon$=18,900

I.R. spectrum (Nujol):
Ketone at 1715 cm.$^{-1}$, aromatic C=C at 1594 and 1499 cm.$^{-1}$.

PHARMACEUTICAL COMPOSITIONS (A) An injectable preparation consisted of 3 mg. of 21-m-sulfobenzoate of 6,16α-dimethyl-2' - phenyl - $\Delta^{2,4,6}$-pregnatrieneolo [3,2-c]-pyrazol-11β,17,21-triol - 20 - one and sufficient liquid excipient to make a volume of 2 ml.

(B) A tablet consisted of 1 mg. of the sodium salt of 21-m-sulfobenzoate of 6,16α-dimethyl-2' - phenyl - $\Delta^{2,4,6}$-pregnatrieneolo [3,2-c]-pyrazol-11β,17,21-triol - 20 - one and sufficient excipient consisting of lactose, amidon, talc and magnesium stearate to make up the desired tablet weight.

PHARMACOLOGICAL STUDY (A) Anti-inflamatory activity

The anti-inflammatory activity was evaluated in the granuloma with cotton test of Meier et al. [Experienta, vol. 6 (1950), p. 469] in which groups of 8 female rats weighing 100 to 110 g. each received an implantation of 2 pellets of cotton each weighing 10 mg. under the skin of the thorax. The test compound was administered subcutaneously in aqueous solution containing sodium hydroxide and propylene glycol at a dose of 5 or 20 μg./kg. in 2 administrations per day for 2 days. One group acting as the control received only the vehicle. On the 3rd day, 16 hours after the last injection the rats were killed and the pellets with their granuloma tissue envelope were cut out and weighed fresh and then after drying in an oven at 60° C. for 18 hours. The weight of the granuloma was obtained by substracting the initial weight of the cotton and the weight of the granuloma formed in the treated rats was expressed as a percentage of the weight of the granuloma in the controls. The weight of the thymus removed at the same time as the granulomas permitted an indication of the immediate thymolytic activity of the products. The anti-inflammatory activity of 21-m-sulfobenzoate of Formula I in which R is hydrogen was compared under the same conditions with that of cortivazol (21-acetate of 6,16α-dimethyl-2'-phenyl-$\Delta^{2,4,6}$-pregnatrieneolo [3,2 - c]-pyrazol-11β,17-21-triol-20-one as a suspension in an isotonic sodium chloride solute containing 0.2% of polysorbate 80. The results are reported in Table I.

TABLE I

| Group | Dose administered in µg./kg. | Dry granuloma | | Fresh thymus | |
|---|---|---|---|---|---|
| | | Weight in mg. | Percent of inhibition | Weight in mg. | Percent of inhibition |
| Control | 0 | 73.3 | | 309 | |
| 21-m-sulfobenzoate | 5 | 45.8 | 38 | 305 | 22 |
| | 20 | 38.0 | 48 | 241 | 18 |
| Cortivazol | 5 | 46.1 | 37 | 252 | 29 |
| | 20 | 31.4 | 57 | 192 | |

Table I shows that the 21-m-sulfobenzoate of the invention has an anti-inflammatory activity comparable to cortivazol.

(B) Thymolytic activity

The thymolytic activity was determined on groups of 6 young male rats weighing about 60 g. and the test compounds were administered in an isotonic sodium chloride solute intraperitoneally at a dose of 200 µg./kg. (expressed in molecular equivalent of dexamethasone). One lot serving as the control received only the vehicle. The groups of animals were killed after 8, 16, 24, 48 hours and 7 days of treatment. The thymus was removed and the weight thereof was expressed in mg. The percentage of involution of the thymus of the treated animals was compared to the average value of the thymus weight of the controls. The thymolytic activity of the 21-m-sulfobenzoate was compared to cortivazol, dexamethasone and dexamethasone phosphate under the same conditions and the results are reported in Table II.

TABLE II

| Test compound | Percent of involution of thymus after— | | | | |
|---|---|---|---|---|---|
| | 8 hours | 16 hours | 24 hours | 48 hours | 7 days |
| 21-m-sulfobenzoate | 9 | 37 | 43 | 65 | 64 |
| Cortivazol | 12 | 26 | 14 | 26 | 15 |
| Dexamethasone | 20 | 38 | 41 | 47 | 8 |
| Dexamethasone phosphate | 15 | 34 | 41 | 22 | 0 |

Table II shows that 21-m-sulfobenzoate possesses a more durable activity than cortivazol which difference is manifested in the 16th hour and the action is maintained for 7 days with the same intensity.

(C) Lymphopeniant activity

This test is based on the direct action of corticoids on lymphocytes expressed by a diminution of the number of circulating leucocytes. After one leucocytary counting, the 21-m-sulfobenzoate was intraperitoneally administered to groups of 8 male rats weighing about 100 g. in solution in isotonic sodium chloride solute at a dose of 200 µg./kg. (expressed in molecular equivalent of dexamethasone). One control group received only the vehicle, 2, 7, 16, 24 and 48 hours and 7 days after the administration, a second counting of leucocytes was made on the blood taken from ophthalmic plexus.

The leucocytes were counted by a computer after the red blood corpuscles were hemolyzed with saponin. The percentage of diminution of leucocytes was determined by comparison with the controls. The lymphopeniant activity of the 21-m-sulfobenzoate of the invention was compared to that of cortivazol under the same conditions and the results are reported in Table III.

TABLE III

| | Percentage of diminution of leucocytes after— | | | | | |
|---|---|---|---|---|---|---|
| | 2 hours | 7 hours | 16 hours | 24 hours | 48 hours | 7 days |
| 21-m-sulfobenzoate | 35 | 54 | 52 | 77 | 47 | 51 |
| Cortivazol | 11 | 44 | 33 | 57 | 60 | 0 |

Table III shows that the 21-m-sulfobenzoate has a more rapid, more intense and more durable lymphopeniant activity than cortivazol and provokes a strong leucopenia lasting for 7 days while the same effect for cortivazol has disappeared.

(D) Acute toxicity

The acute toxicity of 21-m-sulfobenzoate was determined on groups of female mice weighing 19 to 23 g. which had been starved for 6 hours. The said product was administered orally, subcutaneously and intravenously in solution in distilled water containing 3% of absolute alcohol at doses of 600 and 1200 µg./kg. The volume administered in each case was 0.4 ml. of 20 g. of body weight. After observation for 8 days, no mortalities were ascertained.

CLINICAL STUDY

Case history No. 1

The sick person was 56 years old and had presented for 3 years asthmatic crisis of exogenic origin without cardiovascular reverberations. Allergological investigation placed in evidence a strong sensibilization to dust and streptococci. The patient was treated without success with a combination of prednisone and antibiotics. Following a crisis of paroxystic dyspnea, the patient received intramuscularly 3 mg. of the said 2-m-sulfobenzoate and 15 minutes after injection, the dyspnea was controlled. The patient was inspected the next day and did not have any crisis for 24 hours after the injection.

Case history No. 2

The patient was 47 years old and had asthmatic crisis for 10 years accompanied with an important asthenia and after returning from his holidays in September, the patient had a strong dyspneic crisis that was not halted by oral administration of 10 mg. of prednisone. The patient received intramuscularly 3 mg. of the 21-m-sulfobenzoate and in one half hour, the dyspnea was controlled. Moreover, the habitual rhinitis associated with the patients asthma was also controlled. The amelioration obtained persisted for 48 hours after the single injection. The patient was treated several times after dyspneic manifestations with an injection of 4 mg. of 21-phosphate of dexamethasone and the effect obtained with this last product was not as prolonged as that obtained with 2-m-sulfobenzoate.

Case history No. 3

The patient was 36 years old and had asthmatic crisis of exogenic origin. Allergological investigation showed a strong sensibilization to candy, streptococci and vaccine of Pasteur Institute CCB (used for bronchical complications of asthma). In September, the patient had a strong dyspneic crisis which could not be controlled with the usual treatments (theophylline or dexamethasone phosphate). The patient received intramuscularly 3 mg. of the said 21-m-sulfobenzoate and within a half hour, the dyspnea and the accompanying hyperemotitivity disappeared and by auscultation, one observed the disappearance of the rales. The resulting amelioration was maintained for about 24 hours and the said results can not be obtained by the administration of 21-phosphate of dexamethasone.

Case history No. 4

The patient, 55 years old, had asthmatic crisis of exogenic origin associated with an allergic rhinitis. Allergological investigations showed a strong sensibilization against grass and dust. In September, the patient having a strong dyspneic crisis received intramuscularly 3 mg. of the 21-m-sulfobenzoate and 20 minutes after the injection, the dyspneic crisis was controlled and by auscultation, the rales had completely disappeared. The associated allergic rhinitis also disappeared.

Case history No. 5

The patient, 23 years old, had an allergic rhinitis associated with asthma of exogenic origin. Allergological investigation showed a strong sensibility to household dust and to grass pollens (absinthe, armoision, dandelion). The patient who suffered all dyspneic crisis every evening could not be controlled after administration of theophylline suppositories. The patient then received intramuscularly 3 mg. of the 21-m-sulfobenzoate and after a half hour, the dyspnea totally disappeared and had a strong diminution of the intensity and number of rales. The amelioration obtained by the administration of the 21-m-sulfobenzoate was maintained for 48 hours. The patient was treated before with the 21-phosphate of dexamethasone verifies that the 21-m-sulfobenzoate effected a more rapid, greater and more durable amelioration.

Case history No. 6

The patient, 14 years old, had eczema and asthmatic crisis of exogenic origin and allergological investigation showed a strong sensibility to dust, feathers, grass pollen and cat fur. Upon return from holidays, the patient showed a dyspneic crisis every evening received intramuscularly 3 mg. of the 21-m-sulfobenzoate and after a half hour, auscultation showed a strong reduction of rales. Also observed was a diminution of pruris. On the day after the injection, the patient did not experience any nocturnal dyspneic crisis.

Case history No. 7

The patient, 21 years old, showed ashtmatic crisis of exogenic origin evolving over several years and allergological investigation showed a strong sensibility to cat fur, to dust, to feathers and to wool. In the course of the investigation, the patient showed a strong asthmatic crisis and received at once 3 mg. of the 21-m-sulfobenzoate intramuscularly. The asthma crisis was calmed in a half hour and also the rales and dyspnea disappeared completely. Three days later, new tests on the patient were effected to complete the allergological investigation releasing a strong dyspneic crisis. The patient received intravenously 3 mg. of the 21-m-sulfobenzoate. The asthma crisis calmed in 15 minutes and after 30 minutes, auscultation showed a complete disappearance of rales. In the two days after the injection, the patient did not feel any nocturnal dyspneic crisis.

Case history No. 8

The patient, 65 years old, showed urticaria associated with edema of the tongue and of glottis. Following a strong outburst of urticaria associated with edema of the eyelids, the tongue and oral mucous, the patient received intramuscularly 3 mg. of the 21-m-sulfobenzoate and a half hour after the injection, a clear reduction of edema of the eyelids and oral mucous was observed with an attentuation of urticaria spots. After a week, the patient did not notice any edema or urticaria after the treatment with the 21-m-sulfobenzoate and the action thereof was rapid and durable.

Case history No. 9

The patient, 28 years old, showed asthmatic crisis of exogenic origin and allergological investigation showed a sensibility to feathers, dust and diverse microbial germs. After a strong asthmatic dyspnea, the patient received intramuscularly 3 mg. of 21-m-sulfobenzoate and a half hour after the administration, a very clear amelioration of the state of the patient was observed with a disappearance of dyspnea and a reduction of rales by auscultation. The amelioration persisted for more than a week.

Various modifications of the product and process of the invention may be made without departing from the spirit or scope thereof and it should be understood that the invention is to be intended to be limited only as defined in the appended claims.

I claim:
1. 21-m-sulfobenzoates of 6,16α-dimethyl - 2' - phenyl-Δ$^{2,4,6}$-pregnatrieneolo [3,2-c]-pyrazol - 11β,17,21 - triol-20-one of the formula

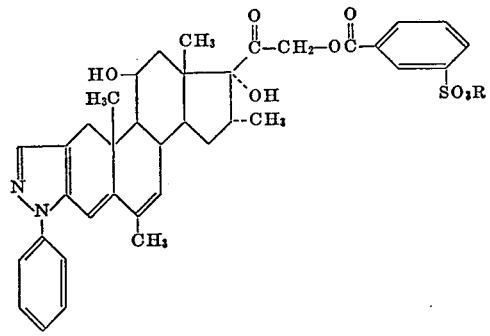

wherein R is selected from the group consisting of hydrogen and alkali metal.
2. A compound of claim 1 wherein R is hydrogen.
3. A compound of claim 1 wherein R is sodium.

References Cited
UNITED STATES PATENTS 3,037,034  5/1962  Joly et al. ......... 260—397.45
3,221,008  11/1965  Wolf et al. ......... 260—210

HENRY A. FRENCH, Primary Examiner

U.S. Cl. X.R.
424—241